June 4, 1929.   C. G. HAWLEY   1,715,549
DUST COLLECTOR AND GAS CLEANER
Filed March 11, 1926
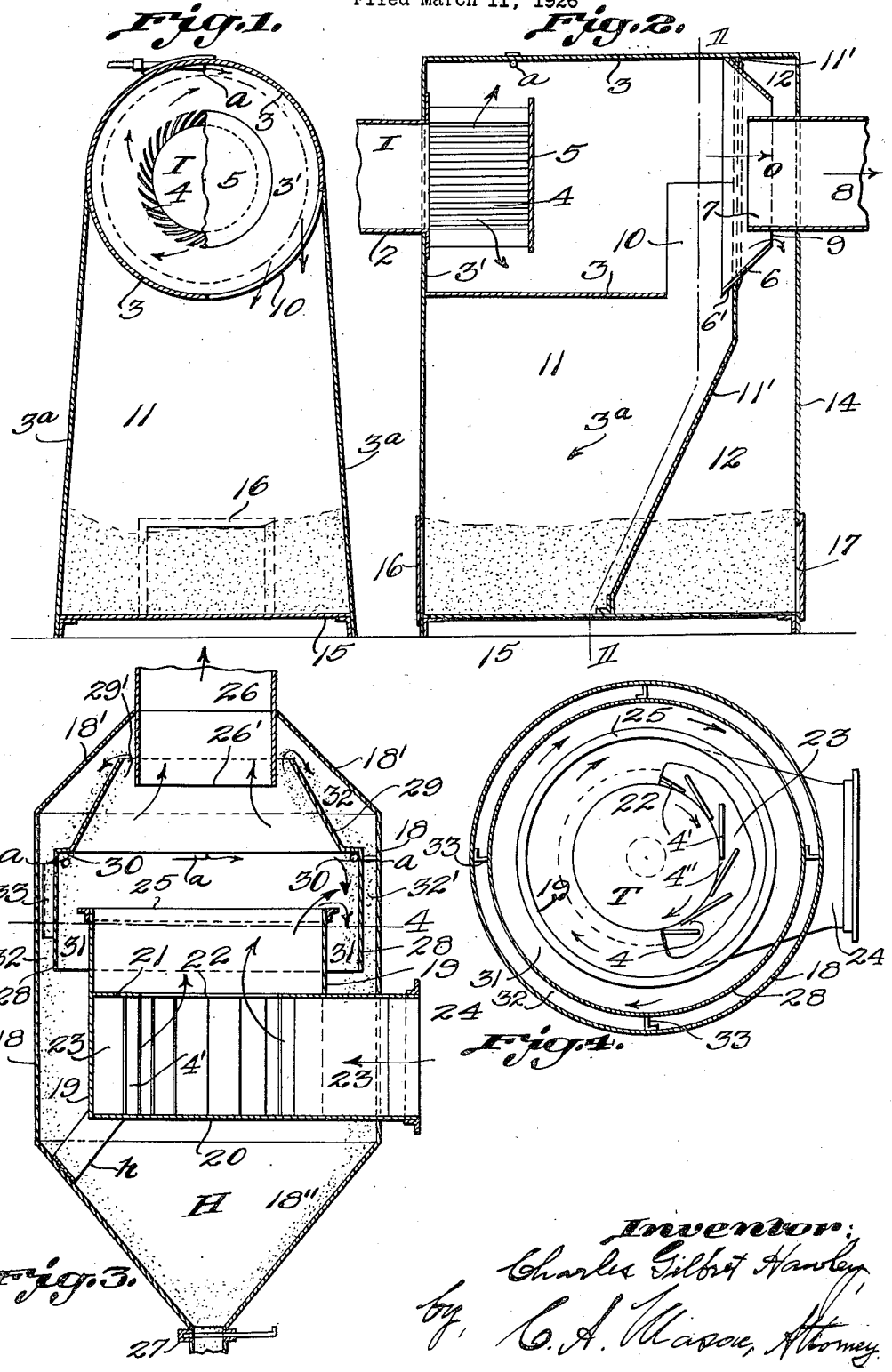

Patented June 4, 1929.

1,715,549

UNITED STATES PATENT OFFICE.

CHARLES GILBERT HAWLEY, OF CHICAGO, ILLINOIS, ASSIGNOR TO CENTRIFIX CORPORATION, OF CLEVELAND, OHIO, A CORPORATION OF OHIO.

DUST COLLECTOR AND GAS CLEANER.

Application filed March 11, 1926. Serial No. 94,085.

My invention relates to means for extracting dust from air and gas and has particular reference to the improved dust collectors which in themselves comprise complete units and may be directly included in any air or gas line, as well as being adapted for use at the exhaust ends of such line. Further, the invention contemplates dust collectors of such construction that they may be used at the suction ends of air and gas lines quite as well as at the pressure or exhaust ends thereof. The foregoing and other objects of the invention will more fully appear hereinafter.

The invention will be readily understood on reference to the drawings which form part of this specification and in which Fig. 1 is a vertical section of a dust collector of the horizontal type embodying this invention, the section being taken upon respective line of Fig. 2; Fig. 2 is a vertical longitudinal section of the dust collector; Fig. 3 is a vertical section of a modified form of the dust collector; and Fig. 4 is a horizontal section thereof on the line 4—4 of Fig. 3. It will be noted that in each case the dust laden air or other gas enters the end of a cylindrical separating chamber and there by means of a tangentially bladed tuyère is formed into a rapidly whirling column and thus proceeds towards an exit or outlet. The latter is smaller than the whirling column but coaxial therewith. It will further be observed that the whirling action within the cylinder or casing results in the effective centrifugal separation of the dust against the inner surface of the cylinder and that the dust thus separated is whirled forward toward said exit. Prior to reaching the exit the main body of dust is permitted to escape latterally from the cylindrical casing and falls into a pocket that is placed to receive it. The small residue of dust that is not at first held upon the wall of the casing, is caught at the end of the casing before it can enter said exit and is disposed of through an opening surrounding the pipe or collar that contains the exit opening for the stream of air.

The operation or process of separating or collecting the dust may be conducted as above described, that is, with the dust in a dry state or, as clearly pointed out in my companion application S. N. 93,797, filed March 10, 1926, the casing may be sprayed internally with a sufficient amount of liquid to maintain a film of moisture upon its entire surfaces and rely upon such film to aid in collecting and holding the dust particles. Or, as pointed out in said companion application, when moisture carrying hot air or gas is under treatment, the casing may be cooled externally as a means of condensing the moisture in the gas and thus establishing from within the stream itself the better means for retaining the dust upon the walls of the casing. In both cases the excess moisture is discharged into the pockets or hoppers along with the dust. These features of my invention are so clearly disclosed in said companion application that I have not thought it necessary to illustrate them in detail in the drawings of this application, beyond indicating that the spray pipes $a$ (like those of the companion application) are arranged to deliver the liquid streams tangentially against the inner walls of the dust collector casings or cylinders. The parts $a$ clearly appear in Figs. 1, 2, and 3.

Referring now to Figs. 1 and 2, the cylinder 3 will be seen to have an inlet 2 at one end and an outlet pipe 8 at the other. The first contains the inlet I and the latter the outlet O. Positioned at the inlet I and located within the cylinder is a tangentially bladed tuyère 4 having the top plate 5 and through which the gases are directed upwardly and whirlingly against the internal surface of the cylinder 3, as indicated by the arrows of Figs. 1 and 2. The casing 3 is positioned upon the horizontal axis and is supported by the component walls 3', 3ª, 3ª and 14. The plate 15 forms a bottom for the compartments 11 and 12. The part 11' is a transverse partition extending from top to bottom and serving to divide the space into the two dust pockets or hoppers 11 and 12. The pipe 8 extends inward beyond the wall or end 14 so that the outlet O is really formed by the inner end 7 of the pipe 8. The partition 11' contains a large central opening and therein is located the truncated cone 6, which forms a first or intermediate end for the cylinder or casing 3. At the larger end the cone is joined to the wall of the casing 3 being rigidly held with respect thereto by being welded or otherwise attached to the margin of the opening in the plate 11'. The smaller end of the cone 6 extends beyond the end 7 of the pipe a and, being of larger diameter than the latter, a peripheral opening 9 is there provided for the discharge of the fine dust, as about to be explained.

Obviously, the opening 9 communicates with the top of the hopper 12. The cylinder itself contains the large peripheral opening 10 for the discharge of a greater part of the dust into the hopper 11. 16, 17, represent clean-out doors for the hoppers 11 and 12.

By preference, the opening 10, so to speak, extends beneath the cone 6, so that the edge 6' thereof is allowed to overlap the adjacent partition 11'. In that position it tends to prevent a back flow of dust from the hopper 11.

The velocity of the stream of dust laden air or gas passing through the collector may be little or great. In either case the tuyère or whirl promoting means 4, subdivides the stream into many streams which are projected tangentially from the member 4 and against the confining or opposed wall of the casing 3, thereby the stream is organized into a whirling column and the dust is centrifugally separated and is caused to whirl and progress spirally toward the outlet end of the casing. For acting upon dusts of low specific gravity it is recommended that the described film of moisture be maintained upon the inner surface of the casing, but for heavier dusts that is unnecessary. Arriving at the opening 10 the dust is tangentially projected into the hopper 11, following the course defined by the arrows at the bottom of the cylinder. Passing that point the whirling column impacts the cone 6 and the residue of dust being thus deposited is whirled through the opening 9 and falls into the pocket 12. Meantime, the dust freed stream whirlingly departs through the outlet O.

The dust collector of the vertical type, shown in Figs. 3 and 4, is of somewhat more complicated construction but operates on the same principle, being modified only in particulars that are required to adapt the same to the vertical position. Also, the structure differs in the employment of a tuyère or whirl promoting element T of the kind that receives the dust laden stream from the exterior, conducts it inwardly, initiates the separation within itself, and discharges the partially separated air and dust into the cylindrical casing.

The tuyère T comprises the series of tangential blades 4' and therefore has a like series of tangential tuyères 4''. These blades are positioned between the bottom 20 and the top 21, which are parts of the intake chamber 23. The dust laden air enters through the connection 24. The opening 22 in the plate 21 corresponds to the inner periphery of the tuyère T as marked by the inner edges of the several blades 4'. The cylindrical wall 19 defines the periphery of the receiving chamber 23 and preferably rises a short distance above the plate 21. That part of the cylinder 19 and the cylindrical member 28 correspond to the cylinder 3 of Fig. 2. In this case the cylinder is interrupted in order to provide the downgoing dust discharge space 31. The top of the member 28 is marked by a perpendicular annular shoulder 30 and from there on by the truncated cone 29 which corresponds to the part 6 of Fig. 2. The outlet pipe 26 presents its inner end 26' at a point below the top of the cone 29, thus forming the now familiar dust ejecting opening 29'.

The foregoing parts are enclosed by the external jacket, marked 18', 18 and 18'', whereby the passages 32 and 32' are defined for the delivery of the collected dust downward and finally into the part 18'', which last forms a collecting hopper, and is provided with a discharge valve 27. The members 28, 30, and 29, may be supported by the spacers 33, extending from the jacket 18.

When the water jets a are employed I prefer that they be positioned beneath the annular reaction shoulder 30, as clearly shown in Fig. 2.

The dust laden air or gas entering the chamber 23 through the connection 24 flows through the tuyères 4'' and is set into whirling motion within the tuyère T. Thereby an initial separation is caused within the tuyère itself. On emerging from the tuyère the whirling stream expands within the guard collar 19 and the dust is carried upward and over the top 25 thereof and discharged against the cylindrical part 28. Under the influence of the reaction shoulder 30 most of the dust is caused to descend into the hopper through the peripheral passage 31. As explained this action may be assisted by streams of water entering through the nozzles a and whirling in the same direction. The whirling column on passing the shoulder 30 impacts the cone 29 and the residue of dust being collected thereon is discharged through the peripheral opening 29', leaving only free air or gas to escape through the outlet pipe 26.

Various modifications of my invention will readily suggest themselves to one skilled in the art, and it is to be understood that the invention is not limited thereto. Instead, the essential scope and details of the invention are to be ascertained from the appended claim as read in the light of the foregoing.

Having thus described my invention I claim as new and desire to secure by Letters Patent:

The hereindescribed dust collector, comprising a cylindrical casing having an inlet at one end and an outlet at the other, in combination with whirl promoting means positioned at said inlet, distant from said outlet, an opening in said casing for the peripheral discharge of dust therefrom before reaching said outlet, said casing having a conical end between said opening and said outlet and itself presenting a second dust discharge opening in advance of said outlet, and means for receiving the dust from said openings.

In testimony whereof I have hereunto set my hand this 9th day of March, A. D., 1926.

CHARLES GILBERT HAWLEY.